United States Patent
Tipton et al.

[11] 3,882,107
[45] May 6, 1975

[54] ZINC CHELATE OF 2,4-DIHYDROXY-1,4(2H)-BENZOXAZINE-3-ONE

[75] Inventors: Carl Lee Tipton, Ames, Iowa; Francis Hsiang-Chian Tsao, Chicago, Ill.

[73] Assignee: Iowa State University Research Foundation, Inc., Ames, Iowa

[22] Filed: May 14, 1973

[21] Appl. No.: 360,336

[52] U.S. Cl.............. 260/242; 260/473 IG; 424/245
[51] Int. Cl. ............................................ C07f 3/06
[58] Field of Search ................................... 260/242

[56] References Cited
OTHER PUBLICATIONS
Honkanen et al., Acta Chem. Scand., Vol. 14, pp. 504–507, (1960).

Primary Examiner—Harry I. Moatz

[57] ABSTRACT

A process for producing 2,4-dihydroxy-1,4(2H)-benzoxazin-3-one (DIBOA) having the formula:

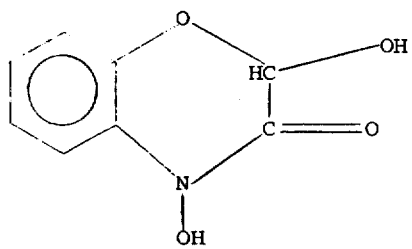

which comprises reacting an appropriate o-nitrophenolate with an alkyl chlorofluoracetate to produce the associated alkyl o-nitrophenoxyfluoroacetate, and thereafter reacting this product with zinc to obtain the zinc complex (chelate) of DIBOA. This intermediate is a novel compound, which can be readily converted to DIBOA by reaction with ethylenediaminetetraacetic acid (EDTA). DIBOA itself is a known compound having growth inhibiting activity against certain microorganisms.

1 Claim, No Drawings

ZINC CHELATE OF 2,4-DIHYDROXY-1,4(2H)-BENZOXAZINE-3-ONE

BACKGROUND

Anti-microbial activity has been demonstrated for 2,4-dihydroxy-1,4(2H)-benzoxazin-3-one(DIBOA). O. Wahlroos and A. I. Virtanen, *Acta Chemica Scandinavica*, 13, 1906–1908 (1959); and E. Honkanen and A. I. Virtanen, *Acta Chemica Scandinavica*, 14, 1214–1217 (1960). DIBOA also has similar properties to its 7-methoxy analogue (DIMBOA), which can be used as a feeding deterent for lavae of the European corn borer. See E. Honkanen and A. I. Virtanen, *Acta Chemica Scandinavica*, 13, 1906–1908 (1959). However, DIMBOA is a naturally occurring compound which is difficult to synthesize.

Methods have therefore been sought to provide a satisfactory and inexpensive source of DIBOA. Heretofore, however, there has been no efficient method of synthesizing large quantities of DIBOA. A previous synthesis of DIBOA is reported in *Acta Chem. Scand.* 14, 504 (1960). In general, this comprised the reduction of an aryl nitro compound to the N-aryl hydroxylamine with zinc in ammonium chloride, followed by acylation and cyclization. While this synthesis produced DIBOA, the overall yield was only about 3.5 percent, thereby making it impractical for large-scale use. While it is sometimes possible to increase such yields by the use of a bulky substituent ortho to the nitro group, this type of synthesis has generally not been found to be commercially feasible.

DESCRIPTION OF INVENTION

The new synthesis of the present invention overcomes the problems associated with the method of the prior art, and produces 2,4-dihydroxy-1,4(2H)-benzoxazin-3-one (DIBOA) with much improved yields. In general, the method comprises first reacting under ambient conditions an o-nitrophenolate (I) and an alkyl chlorofluoroacetate (II) according to the following equation:

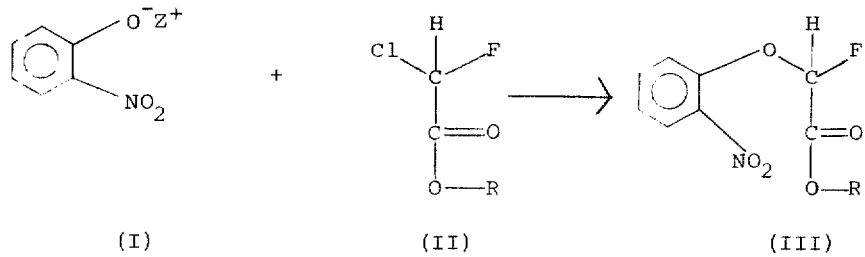

This reaction produces the associated alkyl o-nitrophenoxyfluoroacetate (III), which is further reacted under ambient conditions with zinc in an aqueous solution containing ammonium chloride to produce the zinc chelate of DIBOA (IV), which may be recovered, or reacted in situ with ethylenediamine-tetraacetic acid (EDTA) to form DIBOA. The formation of the zinc chelate can be represented by the equation:

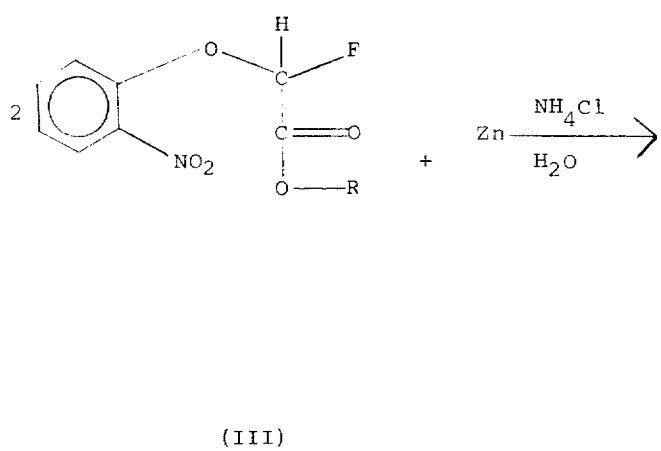
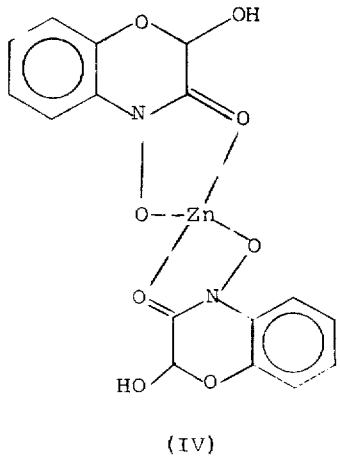

The zinc chelate (Compound IV) can also be represented as (DIBOA)$_2$:Zn, indicating the stoichiometric proportions of 1 mole of zinc complexing with 2 moles of DIBOA. In Compound I, Z represents either sodium or potassium, while in Compound II R represents an alkyl group of from one to four carbon atoms, such as, for example, methyl, ethyl, propyl, butyl and structural isomers thereof. In a preferred embodiment, it is advantageous to employ potassium-o-nitrophenolate and ethyl chlorofluoroacetate in the synthesis.

The reaction of ethylenediaminetetraacetic acid (EDTA) with the zinc chelate, (DIBOA)$_2$:Zn, can be represented as:

$$(DIBOA)_2:Zn + EDTA \longrightarrow 2DIBOA + EDTA:Zn$$

Preferably the EDTA is used in excess to assure complete conversion of the zinc chelate to free DIBOA.

The following detailed examples further illustrate the process and product aspects of the invention.

EXAMPLE I (Preparation of DIBOA)

Potassium o-nitrophenolate was prepared by dissolving 13.9 grams (g.) o-nitrophenol in 50 millileters (ml) of absolute ethanol with gentle warming; thereafter, 5.6 g. of potassium hydroxide was dissolved in 200 ml. of abs. ethanol, also with gentle warming. The KOH solution was filtered into a 1 liter beaker and the o-nitrophenol was added with stirring. Orange needles formed in about 1 hour and were filtered after 2 hours, and were then washed with two 200 ml. portions of absolute ethanol and dried. The yield was 100 percent.

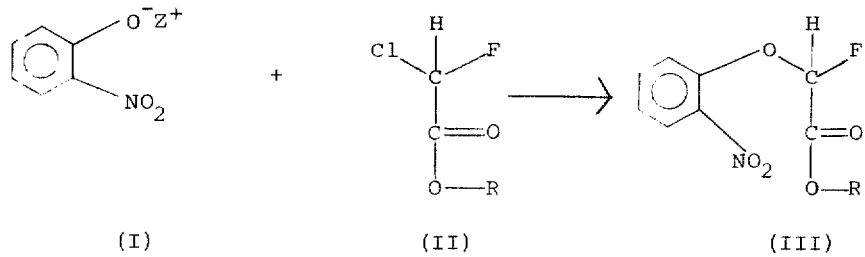

The alkyl o-nitrophenoxyfluoroacetate preferably used in this synthesis is the ethyl homolog, and this was prepared in the following manner. 5 g. of ethyl chlorofluoroacetate was added to 5 g. of the previously prepared potassium o-nitrophenolate in 100 ml of dimethyl formamide. The solution was stirred at room temperature (about 27°C.) for approximately 2 days, during which a white precipitate of potassium chloride formed. The reaction mixture was then diluted with 100 ml. of cold water and extracted with three portions (200 ml. each) of ethyl ether. The cooled ether solutions were then washed with three portions (50 ml. each) of water, dried with anhydrous magnesium sulfate, filtered, and the solvent removed under vacuum with a rotary evaporator at about 20°–25°C. The resulting yellow oil was applied to a column of silicic acid (200 g. Brockman activity grade II, M. Woelm, Auswege, Germany; in a column for 4 × 30 centimeters), which was then eluted with benzene. After a yellow band of o-nitrophenol was eluted, an additional 600 ml. of benzene was used to elute the product. The benzene was thereafter removed under a vacuum at 30°C. in a rotary evaporator, yielding a light yellow oil in approximately 75% yield. The mass spectrum of this product showed a molecular ion at m/e 243, while the calculated molecular weight was 243.2. The fragment ions identified were also consistent with the proposed structure.

The preparation of the final product 2,4-dihydroxy-1,4(2H)-benzoxazin-3-one (DIBOA) was completed by first adding 1.5 grams of zinc dust to a solution of 1 g. of ammonium chloride in 200 ml. of water saturated with ethyl ether. While the zinc dust was maintained in suspension with a magnetic stirrer, 1 g. of the previously prepared ethyl o-nitrophenoxyfluoroacetate was added dropwise over a period of fifteen minutes. The mixture was then filtered to obtain a filtrate containing the zinc chelate of DIBOA. The zinc dust was returned to the reaction beaker. The walls of the beaker were washed down with a small amount of ethyl ether and another portion of ammonium chloride (1 gram) in 200 ml. of water was added. After stirring 15 minutes the reaction mixture was again filtered to obtain a further amount of (DIBOA)$_2$:Zn. The two filtrates were combined, the pH adjusted to about 6.5 with concentrated hydrochloric acid and disodium ethylenediaminetetraacetic acid EDTA) was added to saturate the solution. The EDTA breaks the DIBOA-zinc complex by sequestering the zinc, thereby converting the zinc chelate intermediate to DIBOA. After 5 minutes of stirring the solution was extracted with several portions of ethyl ether. The combined ether extracts were dried with anhydrous magnesium sulfate, filtered and evaporated to a small volume in a vacuum at ambient temperatures. Several volumes of hexane (Skelly B) were added and the solvents were allowed to evaporate at room temperature until crystals formed. The DIBOA product was recrystallized by dissolving it in a small amount of acetone, then adding hexane until the solution became turbid. In a short time colorless needles formed with a yield of about 30 percent. The mass spectrum of this product showed a molecular ion at m/e 181, which corresponds to a calculated molecular weight for DIBOA of 181.16. The product showed a melting point of approximately 147°–148°C., while the literature reports a range for DIBOA of 150°–151°C. This data characterizes the product of DIBOA, namely as 2,4-dihydroxy-1,4(2H)-benzoxazin-3-one:

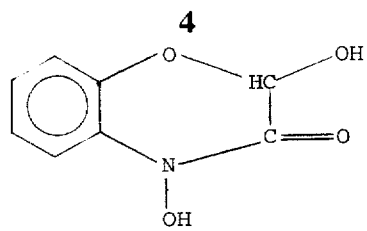

The reaction mechanism of the present invention has been found to exhibit several novel characteristics. First, it has been discovered that the alkyl acetate should be substituted with fluorine and chlorine for the most efficient results. For example, the use of the ethyl dichloroacetate does not produce the desired results because both halogens are replaced during the initial reaction step, leaving a hemiacetal group which decomposes rapidly. Other "leaving groups" are believed to exhibit a similar tendency, thus making them less suitable then the alkyl chlorofluoroacetate compound used herein.

It has also been discovered that in the reduction of the alkyl o-nitrophenoxyfluoroacetate (III) during the last step, two effects occur simultaneously. Specifically, the replacement of —F by an —OH group and the reduction of the nitro group with consequent cyclization occur substantially simultaneously. This mechanism was determined from a consideration of two observable factors. First, in the synthesis and isolation of the alkyl o-nitrophenoxyfluoroacetate, it is exposed to water and hydrolyzation of the fluorine atom does not occur, even though α-halo ethers are known to be very unstable to hydrolysis. Second, if the reduction of the alkyl o-nitrophenoxyfluoroacetate is carried out in a nonhydroxylic solvent, the fluorine atom is not replaced and the compound shown below can be isolated:

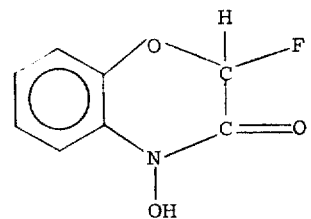

The fluorine in this compound is very stable to hydrolysis, and in fact is not affected even by the treatment with silver nitrate solutions. These results indiicate that the two effects outlined above take place simultaneously in the final reaction step of the instant method.

EXAMPLE II (Preparation of Starting Materials)

In the practice of the present invention, the ethyl chlorofluoroacetate was obtained from PRC Inc., of Gainesville, Florida. However, this compound and related homologs can be prepared by the methods described in an article by B. Englund which appeared in *Organic Syntheses*, Vol. 34, p. 49–50 (1954). That method involves an oxidation of an appropriate halosubstituted ether to obtain the corresponding alkyl chlorofluoroacetate, as shown in the following equation:

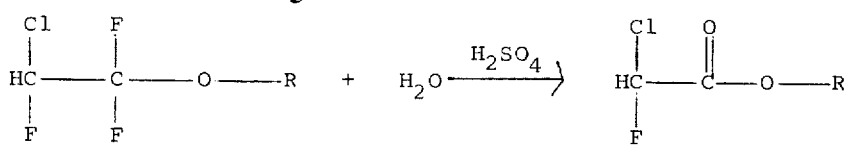

All other compounds and solvents used in the present invention are well known in the chemical arts, and are generally commercially available. It is therefore believed that no preparation or specific source need be given.

EXAMPLE III (Recovery of Zinc Chelate)

Ethyl-(o-nitrophenoxy)-fluoroacetate (1.6 g.) was treated with zinc dust and ammonium chloride as described for the synthesis of DIBOA in Example I. Following filtration to remove unreacted zinc, the filtrate was extracted three times with 100 ml. portion of ethyl ether and the ether solution discarded.

The aqueous solution was then extracted ten times with 100 ml. of portions of 1-butanol. The combined butanol extracts were concentrated to about 50°–100 ml. by addition of water and distillation of the water-1-butanol azeotrope in a rotary evaporator under vacuum. The product was precipitated from solution by addition of ethyl ether and collected by filtration. The product was a brown amorphous solid, Zn content 9.9% by EDTA titration (calc. 13.0% for $C_{16}H_{12}N_2O_8Zn$).

A portion (200 mg.) was dissolved in 35 ml. water; 0.5 millimole of disodium EDTA was added, the pH was adjusted to 4 by addition of 1 N HCl, and the solution was extracted three times with 25 ml. portions of ethyl ether. The combined ether extracts were dried over magnesium sulfate, then filtered and evaporated to dryness in a rotary evaporator. The residue was dissolved in acetone and cyclohexane was added until the solution became turbid, after which DIBOA crystallized from the solution.

We claim:

1. The complex of 2,4-dihydroxy-1,4-(2H)-benzoxazin-3-one (DIBOA) with zinc containing 1 mole zinc to 2 moles of DIBOA.

* * * * *